United States Patent
Jauss et al.

(10) Patent No.: US 12,306,946 B2
(45) Date of Patent: May 20, 2025

(54) MITIGATING A VEHICLE SOFTWARE MANIPULATION

(71) Applicant: Robert Bosch GmbH, Stuttgart (DE)

(72) Inventors: Manuel Jauss, Wissgoldingen (DE); Felix Hallaczek, Stuttgart (DE); Marcel Kneib, Ingelheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 309 days.

(21) Appl. No.: 18/170,351

(22) Filed: Feb. 16, 2023

(65) Prior Publication Data
US 2023/0267204 A1 Aug. 24, 2023

(30) Foreign Application Priority Data
Feb. 23, 2022 (DE) ...................... 10 2022 201 899.0

(51) Int. Cl.
*G06F 21/00* (2013.01)
*G06F 21/55* (2013.01)
*G06F 21/56* (2013.01)

(52) U.S. Cl.
CPC .......... *G06F 21/566* (2013.01); *G06F 21/554* (2013.01); *G06F 2221/033* (2013.01)

(58) Field of Classification Search
CPC ................ G06F 21/566; G06F 21/554; G06F 2221/033; G06F 21/57; B60W 50/06; B60W 50/00; B60W 50/045; B60W 2050/0043; B60W 2050/065; B60R 16/023; G07C 9/00309
See application file for complete search history.

(56) References Cited

U.S. PATENT DOCUMENTS

| | | | | |
|---|---|---|---|---|
| 11,822,649 | B2 * | 11/2023 | Kerstein | H04L 63/1441 |
| 2011/0138188 | A1 * | 6/2011 | Lee | G06F 21/57 |
| | | | | 713/187 |
| 2019/0312892 | A1 * | 10/2019 | Chung | G06F 21/554 |
| 2019/0324858 | A1 * | 10/2019 | Sarkar | H04L 67/34 |
| 2019/0325135 | A1 * | 10/2019 | David | H04L 63/101 |
| 2020/0186556 | A1 * | 6/2020 | Moriya | H04L 43/08 |
| 2021/0288801 | A1 * | 9/2021 | Kulkarni | H04L 9/0631 |

FOREIGN PATENT DOCUMENTS

EP         3291119 A1 *  3/2018 ........... G06F 21/554

* cited by examiner

*Primary Examiner* — William A Corum, Jr.
(74) *Attorney, Agent, or Firm* — NORTON ROSE FULBRIGHT US LLP

(57) ABSTRACT

A computer-implemented method. The method comprises analyzing a communication, secured by one or more cryptographic methods, between a first component of a plurality of components of an on-board network of a vehicle and a central device for mitigating a software manipulation. The central device for mitigating a manipulation is part of the on-board network and is designed for software mitigation in each of the plurality of components of the on-board network. The method further comprises identifying the possibility of a manipulation of the software of the first component in the central device for mitigating a software manipulation, based on the analysis of the communication, and initiating a countermeasure to mitigate the manipulation of the software of the first component by way of the central device for mitigating a manipulation.

13 Claims, 5 Drawing Sheets

MITIGATING A VEHICLE SOFTWARE MANIPULATION

CROSS REFERENCE

The present application claims the benefit under 35 U.S.C. § 119 of German Patent Application No. DE 10 2022 201 899.0 filed on Feb. 23, 2022, which is expressly incorporated herein by reference in its entirety.

BACKGROUND INFORMATION

In recent times, vehicles have increasingly been integrated into open contexts (i.e., the vehicles have one or more interfaces via which data are received and/or sent during operation and then used for operating the vehicle). In addition, the complexity of vehicle components, and particularly their software, is increasing all the time. The ways in which the vehicle software is updated during operation are also becoming increasingly varied.

As a consequence of this, possibilities for manipulating the software of vehicle components are also becoming more varied.

In some related art methods, the detection and above all the mitigation (i.e., remediation, such that a defined (safe) state is reached) of manipulations is associated with considerable effort and hence a time delay. For example, the manipulated software of a component (e.g., of a control device) may be reset during a visit to a workshop in order to remediate the manipulation. In other techniques, software may be requested from a remote computer system and used to reset the manipulated software of a component (e.g., of a control device) in order to remediate the manipulation. In both cases, there may be a considerable period of time between detecting the manipulation and mitigating the manipulation. In some circumstances, the operation of the vehicle is disrupted during this period (for example, a predetermined safety criterion is no longer met). The vehicle may no longer be drivable in some cases, or its functionality may be severely disrupted. Improved techniques for mitigating software manipulation are thus desirable.

SUMMARY

A first general aspect of the present invention relates to computer-implemented method. According to an example embodiment of the present invention, the method comprises analyzing a communication, secured by one or more cryptographic methods, between a first component of a plurality of components of an on-board network of a vehicle and a central device for mitigating a software manipulation. The central device for mitigating a manipulation is part of the on-board network and is designed for software mitigation in each of the plurality of components of the on-board network. The method further comprises identifying the possibility of a manipulation of the software of the first component in the central device for mitigating a software manipulation, based on the analysis of the communication, and initiating a countermeasure to mitigate the manipulation of the software of the first component by way of the central device for mitigating a manipulation.

A second general aspect of the present invention concerns a system designed to carry out the method according to the first general aspect of the present invention.

A third general aspect of the present invention concerns a central device for mitigating a software manipulation in a plurality of components of an on-board network of a vehicle, which device is designed to carry out the method of the first general aspect of the present invention.

A fourth general aspect of the present invention concerns an on-board network for a vehicle. According to an example embodiment of the present invention, the on-board network comprises a plurality of components, including a first component, and the central device for mitigating a software manipulation according to the third general aspect of the present invention.

A fifth general aspect of the present invention concerns a vehicle which includes the system according to the second general aspect of the present invention and/or is part thereof and/or includes the on-board network according to the fourth general aspect of the present invention.

The techniques of the first through fourth general aspects of the present invention may in some cases offer one or more of the following advantages.

Firstly, in some situations it is possible to ensure that the central device for mitigating a software manipulation is able to reliably identify that the software of the first component (and possibly the other components) has been manipulated and then initiate countermeasures. In many cases, a detection of the software manipulation will initially take place locally in the first component. In order for the (remote) central device for mitigating a software manipulation to be able to identify the manipulation itself, the first component must communicate with it (e.g., send a message indicating that a manipulation has been established). This communication by the first component (and possibly the other components) is secured by way of one or more cryptographic methods. In an illustrative example, the communication between a security module of the first component and the central device for mitigating a manipulation may be encrypted. This measure may make it more difficult or impossible for an intruder to eavesdrop on and/or disrupt the communication between the respective component and the central device for mitigating a software manipulation. Without such a measure, an attacker in a system having a central device for mitigating a software manipulation might attempt to frustrate the initiation of mitigating countermeasures by influencing the communication or alternatively fake a manipulation and thus trigger unnecessary countermeasures (which in turn may compromise the operation of the vehicle).

Secondly (and as a consequence of the first advantage), the techniques of the present disclosure permit the in some cases secure use of a central device for mitigating a software manipulation. In comparison to some related art techniques, it is easier for a system with a central device for mitigating a software manipulation to be scaled and/or used in older vehicles (that are not designed to the latest standard). For example, the central device for mitigating a manipulation may be modified relatively easily to "look after" additional components. In some instances, the "looked after" components require little or no modification for this, thus facilitating the use of the device in older vehicles. The central device for mitigating a manipulation may itself also be retrofitted with a software update in some cases. For example, an existing component of a vehicle (such as a central communication interface of the vehicle or a central computer of the vehicle) may be provided with the (additional) function of a central device for mitigating a manipulation by way of a software update.

A number of terms are used in the following way in the present disclosure:

A "component" (of an on-board network) in the present disclosure has its own hardware resources, which include at least one processor for executing commands and memories for storing at least one software component. The term "processor" also encompasses multi-core processors or a plurality of separate elements which undertake (and possibly share) the tasks of a central processing unit of an electronic device. A component may carry out tasks independently (e.g., measuring tasks, monitoring tasks, control tasks, communication tasks and/or other work tasks). In some examples, however, a component may also be controlled by another component. A component may be physically delimited (with its own housing, for example) or may be integrated into a higher-level system. A component may be a control device or a communication device of the vehicle. A component may be an embedded system. A component may include one or more microcontrollers.

An "embedded system" is a component that is integrated (embedded) into a technical context. The component undertakes measuring tasks, monitoring tasks, control tasks, communication tasks and/or other work tasks.

A "(dedicated) control device" is a component which controls (exclusively) a function of a vehicle. For example, a control device may undertake control of an engine, of a brake system or of an assistance system. A "function" may be defined here at different levels of the vehicle (for example, a single sensor or actuator or a plurality of sub-assemblies grouped together to form a larger functional unit may be used for a function).

The term "software" or "software component" may in principle be any part of a piece of software of a component (e.g., of a control device) of the present disclosure. In particular, a software component may be a firmware component of a component of the present disclosure. "Firmware" is a piece of software that is embedded in (electronic) components, where it carries out fundamental functions. Firmware is in functional terms permanently associated with the hardware of the component (such that one may not be used without the other). It may be stored in a non-volatile memory such as a flash memory or an EEPROM.

The term "update information" or "software update information" includes any data that form, either directly or after appropriate processing steps, a software component of a component according to the present disclosure. The update information may contain executable code or code that is still to be compiled (stored in the memory of the corresponding component).

The term "manipulation" in the present disclosure comprises any change to a piece of software of a component of a vehicle. The change may be the consequence of an attack (i.e., the deliberate influencing by a third party) or the consequence of a chance or unintended action.

The term "vehicle" encompasses any structures that convey passengers and/or freight. A vehicle may be a motor vehicle (such as a car or truck) or a rail vehicle. However, floating and flying structures may also be vehicles. Vehicles may be at least partially autonomously operating or assisted.

An "on-board network" may be any internal network of a vehicle via which components of the vehicle communicate. In some examples, an on-board network is a short-range network. An on-board network may use one or more short-range communication protocols (e.g., two or more short-range communication protocols). The short-range communication protocols may be wireless or wired communication protocols. The short-range communication protocols may include a bus protocol (e.g., CAN, LIN, MOST, FlexRay, or Ethernet). The short-range communication protocols may include a Bluetooth protocol (e.g., Bluetooth 5 or later) or a WLAN protocol (e.g., a protocol of the IEEE 802.11 family, e.g., 802.11h, or a later protocol). An on-board network may include interfaces for communicating with systems outside the vehicle and may thus also be integrated into other networks. However, the systems outside the vehicle and the other networks are not part of the on-board network.

The expression "identifying a possibility . . . " means that certain occurrences (e.g., signals or the absence thereof) are interpreted in accordance with predetermined rules in order to identify a state in which a software manipulation may have occurred.

DETAILED DESCRIPTION OF EXAMPLE EMBODIMENTS

Figure 1:
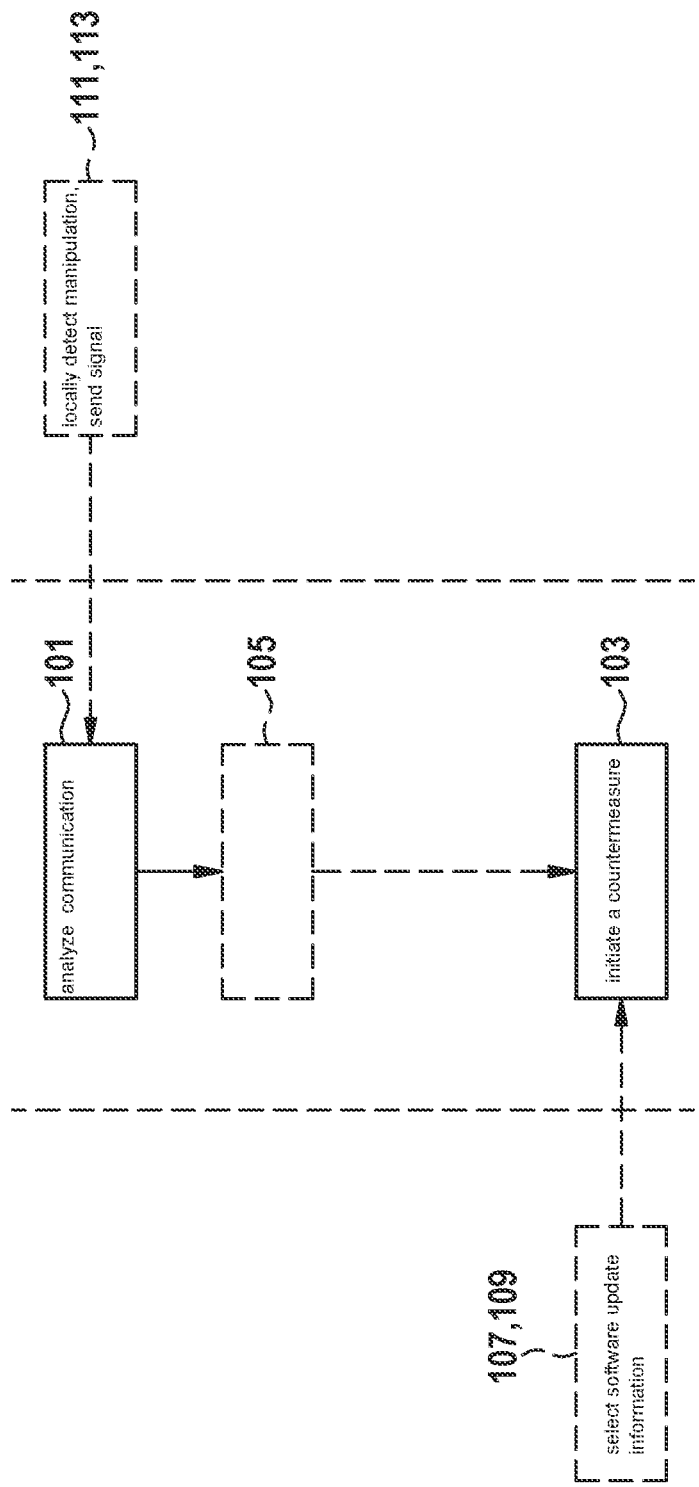
FIG. 1 is a flow chart illustrating the techniques of an example embodiment of the present invention.
Figure 2:
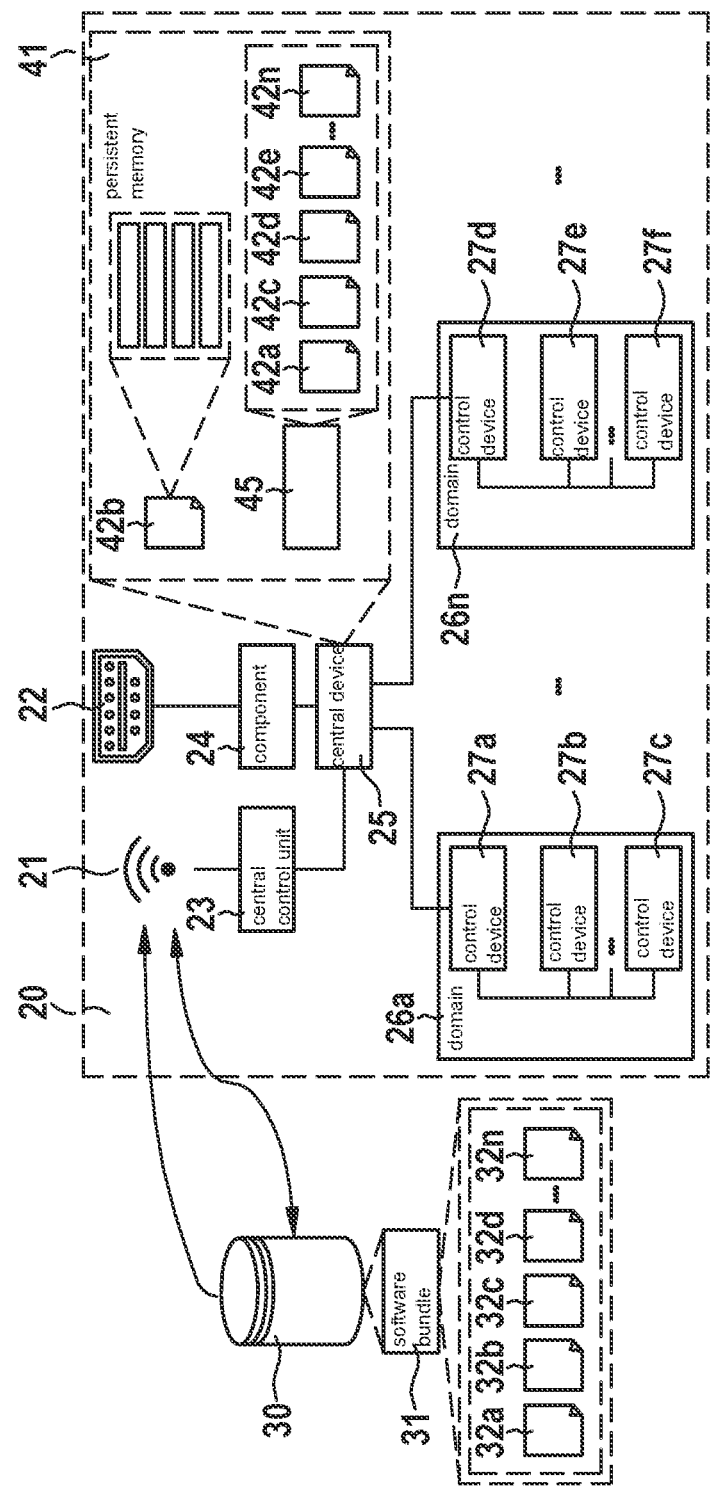
FIG. 2 shows components of an on-board network of a vehicle in which the techniques of the present invention may be used.
Figure 3:
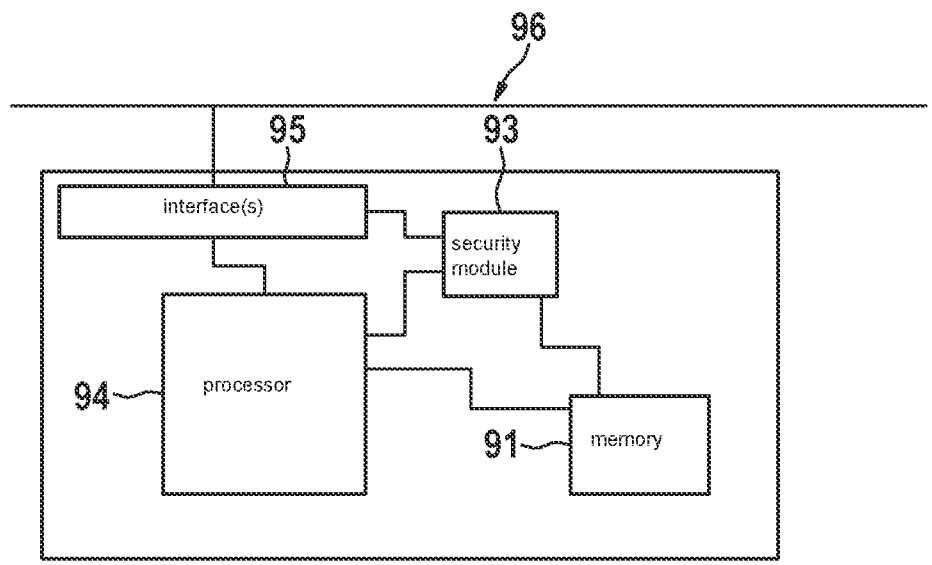
FIG. 3 shows an exemplary component of an on-board network, according to an example embodiment of the present invention.

Firstly, with reference to FIG. 1 through FIG. 3, a vehicle and a component in which the techniques of the present disclosure may be performed and the fundamental aspects of the techniques of the present disclosure are discussed. An example of the technique of the present disclosure is discussed with reference to FIG. 4. Further aspects of the central device for software mitigation are explained by reference to FIG. 5 and FIG. 6.

FIG. 1 is a flow chart illustrating the techniques of the present disclosure. FIG. 2 shows components of an on-board network of a vehicle in which the techniques of the present disclosure may be used. FIG. 3 shows an exemplary component of an on-board network.

In the middle column of FIG. 1, steps are shown which in some examples may be performed by a central device for mitigating a software manipulation (but also by other components in other examples). In the right-hand column, steps are shown which are carried out by a specific component (or a group of components) of the on-board network (excluding the central device for mitigating a software manipulation). In the left-hand column, steps are shown which are performed by a remote system (i.e., outside the vehicle).

The vehicle 20 has a central device for mitigating a software manipulation 25, which identifies the possibility of the manipulation. It is thus part of the on-board network (i.e., also part of the vehicle and moved therewith). Central device for mitigating a software manipulation 25 may be designed to mitigate software manipulation in each of the plurality 21-24, 27a-f of components of the on-board network. In some examples, central device for mitigating a software manipulation 25 is integrated into a central communication interface of vehicle 20. The central communication interface may be designed to function as a data distributor for communication within vehicle 20 and/or, via a communication interface 21, 22, with the outside world. The central communication interface may in this case support various communication protocols (for communication within the on-board network or with external systems) and/or implement security functions. In other examples, the central device for mitigating a software manipulation may be integrated into other components (further examples follow below) or may be designed as a stand-alone component.

The techniques of the present disclosure include analyzing 101 a communication, secured by one or more cryptographic methods, between a first component 27c of a plurality of components 21-24, 25, 27a-f of an on-board network of a vehicle 20 and a central device for mitigating a software manipulation 25. A vehicle 20 is shown schematically in FIG. 2, an exemplary first component 27c in FIG. 3. Vehicle 20 is equipped with an on-board network, which connects a plurality of components 21-24, 25, 27a-f of vehicle 20 (the configuration of the on-board network may be as described above). The term "analyzing" encompasses any evaluation of the content of the communication (e.g., of the content of messages sent) but also an assessment of a pattern of the communication (e.g., a frequency or the absence of messages).

In some examples, the communication comprises a message (or plurality of messages) from first component 27c indicating the possibility of a software manipulation (sent by a security module of the first component, for example; additional information in this regard may be found below in connection with FIG. 3 and FIG. 4). In this case, central device for mitigating a software manipulation 25 may infer the possibility of a manipulation from the content of the message. A message (or a plurality of messages) may indicate the possibility of a software manipulation in various ways. In some examples, a message of a specific type may indicate the possibility of a software manipulation (e.g., with a specific message identifier). Additionally or alternatively, information regarding the possibility of a software manipulation may be included in a payload of a message. In all examples, the transmitted information may be binary (i.e., a possibility of a manipulation exists), or additional information about the manipulation (e.g., a type of manipulation) may be transmitted.

Additionally or alternatively, the identification may involve establishing an absence of an (expected) signal (e.g., a message) (e.g., from first component 27c). The on-board network may be designed in such a way that the plurality of components 21-24, 25, 27a-f or other components send signals which indicate that no manipulation of the software of the respective component of the plurality of components 21-24, 25, 27a-f has taken place (e.g., at regular intervals or with the occurrence of certain events, such as the startup of a component). In some examples, the signal may include a message.

The absence of an (expected) signal (e.g., a message) may be established in various ways. In some examples, an absence may be established if a signal (e.g., a message) does not arrive within a predetermined time (e.g., within a predetermined time following receipt of a previous signal and/or after sending a previous signal). Additionally or alternatively, the absence may be established if the signal (e.g., messages) is (are) no longer received with an expected regularity/frequency. The parameters for establishing the absence of an (expected) signal (e.g., a message) may in some examples be configurable (e.g., may be changed when the vehicle is running).

In some examples, first component 27c (and possibly further components) may repeatedly (e.g., at regular intervals or with the occurrence of certain events) send a signal (e.g., a message) indicating that no manipulation has occurred. Central device for mitigating a software manipulation 25 may establish the possibility of a manipulation if the signal fails to appear (e.g., once or several times and/or for a predetermined time).

In some examples, only first component 27c (and possibly further components) sends a signal (e.g., a message). Central device for mitigating a software manipulation 25 monitors only this signal. In alternative examples, central device for mitigating a software manipulation 25 and first component 27c (and possibly further components of the on-board network) send signals (e.g., a message) alternately if no manipulation has been identified (i.e., in normal operation). In other words, central device for mitigating a software manipulation 25 and first component 27c (and possibly further components of the on-board network) repeatedly exchange signals (e.g., messages). For example, central device for mitigating a software manipulation 25 may first send a signal (e.g., a message) to first component 27c. Once the signal (e.g., the message) has been received by first component 27c, first component 27c in turn sends a signal (e.g., a message) to central device for mitigating a software manipulation 25, etc. The sending may occur at regular or irregular intervals and/or with the occurrence of certain events. Either way, however, a receipt of the signal triggers a subsequent sending. First component 27c and central device for mitigating a software manipulation 25 alternately send and receive signals (e.g., messages).

In all examples in which the absence of a signal is used to identify the possibility of a manipulation, this may allow central device for mitigating a software manipulation 25 to identify the possibility of manipulation even if certain "suppliers" of information are compromised. For example, as described above, an identification of a manipulation may initially take place in the (first) component itself. In these examples, the first component must relay the information that a manipulation has been identified to central device for mitigating a software manipulation 25. It may be that, by manipulating the software of the first component, an intruder renders said component incapable of identifying the possibility of the manipulation and/or of relaying this information. However, the consequence of this intervention may be that the (first) component also no longer sends the signal expected by the central device for mitigating a software manipulation, which signal, from the point of view of the central device for mitigating a software manipulation, thus fails to appear. In this way, the central device for mitigating a software manipulation is able in some situations to identify a possibility of a manipulation (and to initiate countermeasures) even if the first component has been compromised by a manipulation.

Similarly, in the absence of a signal (a message) from central device for mitigating a software manipulation 25, a module of first component 27c (e.g., a security module) may infer the possibility of a manipulation. This may be of particular advantage if the module of first component 27c (e.g., the security module) is not itself affected by the software manipulation but has to access potentially compromised modules of first component 27c in order to communicate. Central device for mitigating a software manipulation 25 may then in some situations be unable to communicate securely with the module of first component 27c (e.g., the security module) (in order to initiate the steps of a countermeasure to be carried out by the module, for example).

There are various ways of securing the communication (e.g., the messages or signals described above). In some examples, a sender in first component 27c is a security module of the first component (more detail below with reference to FIG. 3). In terms of its hardware and/or software, the security module may be separate from the other modules of first component 27c (e.g., it may be a separate physical module). Since the security module initiates or carries out the communication by the first component with the central device, the communication may be (cryptographically) secured. A security module may also be integrated into the communication on the part of central device for mitigating a software manipulation 25 (e.g., all functions of central device for mitigating a software manipulation 25 may be performed on a hardware security module).

Additionally or alternatively, the communication between first component 27c and central device for mitigating a software manipulation 25 may be encrypted for cryptographic protection. Any suitable encryption method may be used for this purpose (e.g., an asymmetric or a symmetric encryption method). For example, a message (or plurality of messages) from first component 27c indicating the possibility of a software manipulation (sent by a security module of the first component, for example) may be encrypted. The message(s) may then be decrypted by central device for mitigating a software manipulation 25.

Further additionally or alternatively, the communication may be provided with digital signatures or with MAC tags ("message authentication code" tags) for cryptographic protection. In these examples, the corresponding recipient (e.g., central device for mitigating a software manipulation 25 or first component 27c) may check the authenticity of the sender of a message (and only initiate further steps once the sender has been authenticated). For example, a message (or plurality of messages) from first component 27c indicating the possibility of a software manipulation (sent by a security module of the first component, for example) may be provided with a digital signature of first component 27c.

Further additionally or alternatively, the communication may be secured by way of authenticated encryption techniques (i.e., the communication is encrypted and authenticated) for cryptographic protection.

Further additionally or alternatively, the communication may be concealed for cryptographic protection. For example, signals used to identify the possibility of an intrusion may be hidden in a data stream of the on-board network (by a steganographic process, by methods for preventing a length analysis of the messages in the communication, such as padding the messages, by methods for preventing an analysis of the times of communication, such as a randomized transmission of messages, or by countermeasures to prevent side-channel attacks, for example). In some examples, signals from which the possibility of an intrusion is identified may be hidden in other messages from central device for mitigating a software manipulation 25 or first component 27c. For example, a message (or plurality of messages) from first component 27c indicating the possibility of a software manipulation (sent by a security module of the first component, for example) may be concealed in one or more other messages from first component 27c. In other examples, a repeatedly sent signal (the absence of which indicates the possibility of a software manipulation) may be concealed in other messages.

Further additionally or alternatively, the messages may be provided with a time stamp for the cryptographic protection of the communication. The recipient may reject messages that are older than a predetermined threshold age.

In each of the cases described above, the cryptographic protection of the communication may make it more difficult (and at best impossible) for an intruder to prevent the information needed to identify the possibility of a manipulation from reaching central device for mitigating a software manipulation 25 or first component 27c and/or modules of first component 27c.

As already described, in some examples a manipulation of the software of first component 27c may be detected locally in first component 27c (step 111 in FIG. 1). To this end, first component 27c may include a (manipulation) detection device 81a. (Manipulation) detection device 81a may be arranged in a security module of the first component. In some examples, (manipulation) detection device 81a may send a signal indicating the possibility of a manipulation of the software of first component 27c (step 113 in FIG. 1).

In other examples or additionally, a (manipulation) detection device 61b of a central communication interface of vehicle 20 may detect the manipulation of control device 27c (remotely) and generate the signal for central device for mitigating a software manipulation 25 (which in the example of FIG. 3 is likewise arranged in the central communication interface of vehicle 20). In some examples, central device for mitigating a software manipulation 25 is thus also designed for a central detection of software manipulation in a plurality of components 27a, c-f of the on-board network.

In other examples or additionally, a detection device of a remote system 30 may detect the manipulation of control device 27c (remotely) and generate the signal for central device for mitigating a software manipulation 25. In this example, the signal may be received via an interface of the vehicle. However, even if the manipulation is detected within the vehicle, a time until the manipulation is mitigated may in some cases be reduced.

The various detection devices 81a, 61b (particularly detection devices 81a, 61b arranged in the vehicle) may be detection devices that are already present in the (on-board) network. As explained above, software manipulations may also be identified in some conventional methods.

The manipulation may be detected in any possible way. For example, a piece of software may be checked on startup ("secure boot") and/or when running ("run-time manipulation detection") using one or more methods for checking the authenticity and/or integrity of the software (e.g., using one or more digital signatures or other cryptographic methods).

In other examples, a signal whose absence indicates the possibility of manipulation is generated by the components described above. For example, a (manipulation) detection device 81a of control device 27c may generate a signal (e.g., at regular intervals or with the occurrence of certain events), the absence of which may indicate a manipulation of the software of control device 27c.

In response to the identification of the possibility of a manipulation of the software of first component 27c of a plurality of components of an on-board network of a vehicle 20 (for example, the receipt of a signal or the identification of the absence of a signal), central device for mitigating a software manipulation 25 initiates a countermeasure 103 to mitigate the manipulation of the first component (which is subsequently carried out in the on-board network). The possible countermeasures are explained in detail later.

With reference to FIG. 3, aspects of first component 27c are now described in more detail (the other components of the present disclosure may likewise have the described structure).

First component 27c has a memory 91. Memory 91 may be, for example, a non-volatile memory (e.g., an EPROM memory or a flash memory). Memory 91 may be designed for storing at least one software component for first component 27c (e.g., for controlling first component 27c). Memory 91 may be a program memory of first component 27c. Memory 91 may comprise only part of the total memory of first component 27c. Alternatively or additionally, memory 91 may be spread across a plurality of hardware modules and/or logical segments.

First component 27c may include a security module 93. In terms of its hardware and/or software, security module 93 may be separate from the other modules of first component 27c (e.g., it may be a separate physical module or a stand-alone peripheral module). The security module may include one or more of its own processors (e.g., at least one crypto accelerator). In other examples, security module 93 may include one or more cores of a multi-core processor or other elements of a higher-level component (which are statically or dynamically assigned to the security module— for example, one or more cores of a multi-core processor may be configured to the security module). In this case too, the security module (e.g., one or more cores of the multi-core processor) is separate from the other elements (e.g., the circuits are physically separated). Security module 93 may in some examples be designed to perform one or more cryptographic functions in order to cryptographically protect the communication with central device for mitigating a software manipulation 25 (e.g., the cryptographic functions described above). In some examples, the communication (to be analyzed for the purpose of identifying the possibility of a manipulation) from first component 27c may originate from security module 93. Additionally or alternatively, security module 93 of first component 27c may be designed to detect a possibility of a manipulation (e.g., it may include a detection device 81a as described above).

In some examples, security module 93 is a hardware security module (HSM). In the example of FIG. 3, security module 93 is an internal security module of component 27c. In other examples, the security module may be an external security module for component 27c (contained, for example, in another component of vehicle 20, e.g., in a central device for mitigating a software manipulation 25).

Component 27c additionally includes a processor 94 for executing commands. As already mentioned, the term "processor" also includes multi-core processors or a plurality of separate elements which undertake (and possibly share) the tasks of a central processing unit of an electronic device. Component 27c may in some examples include one or more interfaces 95, which are designed to communicate along a transmission path 96 of the on-board network. As may be seen in FIG. 3, processor 94, security module 93 or both may directly access the one or more interfaces 95 in order to communicate along transmission path 96 of the on-board network. The transmission path may be a transmission path of a bus system (e.g., CAN, LIN, MOST, FlexRay, or Ethernet).

An exemplary flow of a method of the present disclosure is discussed below by reference to FIG. 4.

Figure 4:
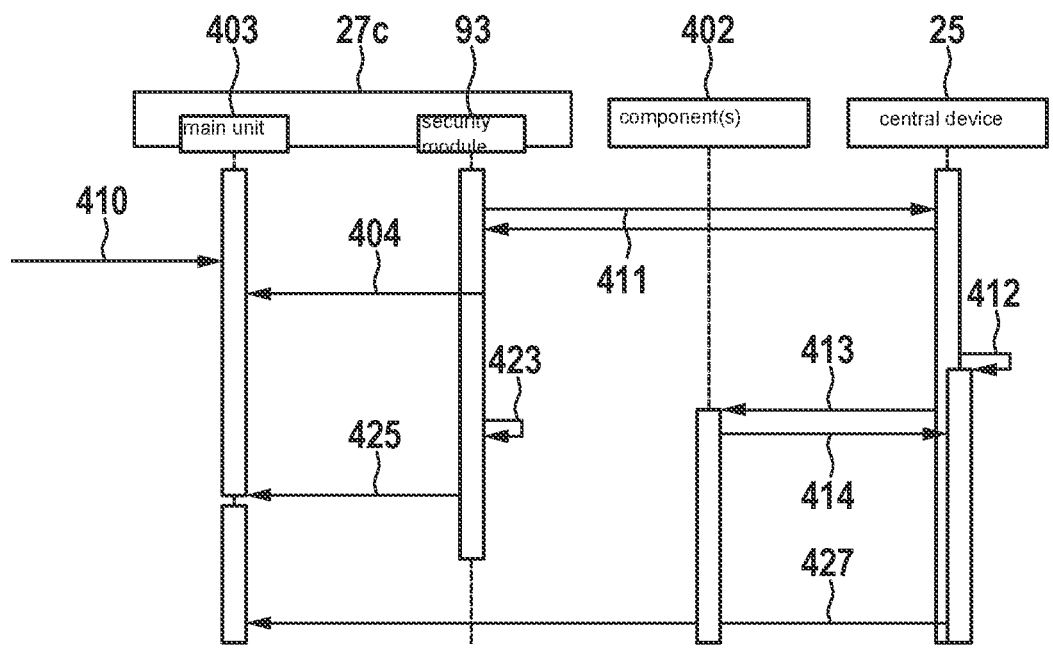
FIG. 4 shows a sequence diagram of an exemplary method of the present invention.

The actions of a specific component (or of one of its modules) or system are shown in each column in FIG. 4. Arrows between the columns symbolize communication between the individual units. A specific component (first component 27c of the present disclosure) is shown on the far left (e.g., an embedded system of vehicle 20, for example a control unit). The component may have two modules, a main unit 403 (which may include a processor 94, for example) and a security module 93. Main unit 403 may be designed to provide a functionality of the component in the vehicle (e.g., measuring tasks, monitoring tasks, control tasks, communication tasks and/or other work tasks). One of the other components 402 of the on-board network is shown in the middle column. The operations of a central device for mitigating a software manipulation 25 are shown on the far right.

A manipulation 410 of the software of first component 27c (or of main unit 403) may occur at a given time, as shown in FIG. 4. The manipulation may be detected 404 by security module 93 of first component 27c. The manipulation may be identified by central device for mitigating a software manipulation 25 by analyzing the communication between central device for mitigating a software manipulation 25 and first component 27c. In the example of FIG. 4, this occurs because a signal 411 which would otherwise be sent (at regular intervals) by first component 27c is not sent at the due time. Central device for mitigating a software manipulation 25 may identify 412 the absence of the signal and hence the possibility of a manipulation of the software of first component 27c and initiate countermeasures.

In the example of FIG. 4, the countermeasure may include shifting a functionality to the other component 402. For example, an instruction to transfer functionality 413 may be sent by central device for mitigating a software manipulation 25 to the other component 402. The other component may then provide the functionality (and possibly send a confirmation 414 to central device for mitigating a software manipulation 25).

Alternatively or additionally, central device for mitigating a software manipulation 25 may initiate further countermeasures (which are carried out in the on-board network). Thus, as in FIG. 4, an absence of a signal 411 that is sent by central device for mitigating a software manipulation 25 to security module 93 at regular intervals provided that no manipulation has been identified, indicates to security module 93 that security module 93 should for its part initiate (and possibly carry out) a countermeasure. The security module is able to detect 423 the absence (by way of the techniques described above, for example). Security module 93 may subsequently change 425 the functionality of first component 27c. For example, main unit 403 may be deactivated. Alternatively or additionally, security module 93 may put main unit 403 into a state in which the manipulated software may be reset (a reprogramming mode, for example). First component 27c is then no longer able to provide the functionality (or only to a limited extent).

In addition, central device for mitigating a software manipulation 25 may be informed that a manipulation has been detected.

FIG. 4 shows that the changing of the functionality of first component 27c ends after the functionality has been shifted to the other component 402. In other examples, the two actions may be performed in the reverse sequence or simultaneously (e.g., within a second).

The manipulation may be remediated (e.g., by resetting 427 the software of first component 27c, as described below).

Aspects of central device for mitigating a software manipulation 25 are explained in the following paragraphs. Central device for mitigating a software manipulation 25 is shown in the example of FIG. 2. In some cases, the vehicle may have only one central device for mitigating a software manipulation 25, which is designed to mitigate manipulations of the plurality of components 21-24, 27a-f (e.g., all components of a vehicle for which a software manipulation may be remediated, or a subset of those components). In other examples, a vehicle may have a plurality of central devices for mitigating a software manipulation, which are part of the on-board network and are each assigned to a plurality of components of the on-board network (i.e., they are able to remediate manipulations in the software of the assigned components). In each case, however, the central devices for mitigating a software manipulation are separate from the assigned components. In some cases, central device for mitigating a software manipulation 25 may also be designed to mitigate a manipulation of its own software and/or of the software of a component into which central device for mitigating a software manipulation 25 is integrated.

In the example of FIG. 2, a plurality of components for which software manipulations may be remediated using the techniques of the present disclosure includes a plurality of control devices 27*a-f*. As already described, the techniques of the present disclosure are not limited to control devices but may be used in principle for any component of an on-board network of vehicle 20. Since control devices 27*a-f* in vehicles often have only limited hardware resources and/or functionalities, however, the techniques of the present disclosure may in some cases be particularly advantageous for control devices.

In FIG. 2, control devices 27*a-f* are subdivided into a number of domains 26*a-n*. The domains may be functional and/or local domains of vehicle 20. A functional domain may comprise various components of a vehicle that are involved in providing a specific function of the vehicle (e.g., engine control unit, powertrain control unit, infotainment, climate control, etc.). A local domain may comprise various components of a vehicle that are physically located in a particular area of the vehicle (e.g., "rear right", "front left", "interior front", etc.).

A domain 26*-n* may in turn contain a component 27*a*, 27*d*, which acts as a central communication node for the respective domain 26*a-n* and/or undertakes control functions for the respective domain 26*a-n*. In some examples, a central device for mitigating a software manipulation may be part of component 27*a*, 27*d*, which acts as a central communication node for the respective domain 26*a-n* and/or undertakes control functions for the respective domain 26*a-n*. This central device for mitigating a software manipulation may be provided in addition to further central devices for mitigating a software manipulation (e.g., a central device for mitigating a software manipulation as part of a central communication interface of the on-board network) or as the only central device for mitigating a software manipulation (see explanations above). Further alternatively or additionally, a central device for mitigating a software manipulation may be designed as part of a central control unit 23 of the vehicle.

Further alternatively or additionally, a central device for mitigating a software manipulation may be arranged as part of a main unit ("head unit") of an infotainment system of vehicle 20 (not shown in FIG. 2). Further alternatively or additionally, a central device for mitigating a software manipulation may be designed as part of a central computer ("vehicle computer") of the on-board network (the on-board network may include a plurality of vehicle computers). A vehicle computer may perform (considerably) better than dedicated control devices of the on-board network and may undertake the tasks of several control devices in some circumstances in several of the aforementioned domains).

Vehicle 20 may furthermore include a central persistent memory 41 (i.e., a memory which stores its information permanently in the vehicle—e.g., for longer than a day or longer than a week and/or when the vehicle is in an idle state). In some examples, persistent memory 41 may include a flash memory. In the example of FIG. 2, persistent memory 41 is arranged in the central communication interface of vehicle 20 or is directly connected thereto. As discussed, central device for mitigating a software manipulation 25 may likewise be arranged in the central communication interface of vehicle 20. Even if a central device for mitigating a software manipulation is arranged (additionally or alternatively) in another component, a persistent memory may additionally or alternatively be arranged in the same component.

In this way, data stored in the persistent memory may be used by the central device for mitigating a software manipulation to mitigate manipulations. In other examples, however, a central device for mitigating a software manipulation and a persistent memory may be arranged in different components of the on-board network (and the central device for mitigating a software manipulation may access the persistent memory via the network).

Persistent memory 41 may be designed to store software components 42*a*, 42*c-n* for each of the plurality of components 27*a-f* at the same time. To that end, persistent memory 41 may be designed with a storage capacity of more than 256 MB (preferably more than 5 GB).

The countermeasure against manipulation may comprise resetting the software of a component for which a software manipulation has been identified (also referred to in the present disclosure as "first component") (e.g., using software components 42*a*, 42*c-n* stored in central persistent memory 41 for the component in question). Further aspects of this further countermeasure are discussed later with reference to FIG. 5 and FIG. 6.

In some examples, software components 42*a*, 42*c-n* that are contained in central persistent memory 41 may be based on software update information 32*a*, 32*c-n* for each of the plurality of components 27*a-n* (e.g., generated from or corresponding to software update information 32*a*, 32*c-n*).

Software update information 32*a*, 32*c-n* may be received via an interface 21 of vehicle 20. Interface 21 may be a wireless interface (as shown in FIG. 2), but in other examples it may also be a wired interface 22 (e.g., an interface for on-board diagnostics). The vehicle may be designed to receive software update information 32*a*, 32*c-n* from remote system 30 via one of interfaces 21, 22. As shown in FIG. 1, remote system 30 may select 107 software update information 32*a*, 32*c-n* for the corresponding vehicle and send it to vehicle 20 via one of interfaces 21, 22. Remote system 30 may be any system that is suitable for providing software update information 32*a*, 32*c-n* (e.g., a cloud storage facility and/or a distributed system). As well as providing software update information 32*a*, 32*c-n*, remote system 30 may undertake further functions in the operation of the vehicle (e.g., monitoring and/or control functions for vehicle 20).

In some examples, software update information 32*a*, 32*c-n* for a plurality of components (e.g., control devices 27*a, c-n*) is included in a software bundle or software container 31 (i.e., the software update information is provided in a bundled format). Software bundle or software container 31 (often of considerable size) is transmitted to vehicle 20 at a specified time. The transmitted software update information 32*a*, 32*c-n* is used in vehicle 20, as described, to update the software of the plurality of components 27*a-f*. To this end, software update information 32*a*, 32*c-n* received from remote system 30 may go through one or more preparatory steps (e.g., unpacking, verification of a signature, etc.). Additionally or alternatively, the software update information may remediate a vulnerability in the on-board network of the vehicle.

Additionally or alternatively, software update information 32a, 32c-n (e.g., in a software bundle or software container) may also be received via a wired interface 22.

Software update information 32a, 32c-n may be stored, before or after any preparatory steps, in persistent memory 41 as software components 42a, 42c-n for the plurality of components 27a, c-n (e.g., before being used to update the software of components 27a, c-n). Stored software components 42a, 42c-n for the plurality of components 27a, c-n are then available to central device for mitigating a software manipulation 25 for mitigating a manipulation in the plurality of components 27a, c-n. This mitigation may take place on completion of the updating of the software of each of the plurality of components 27a, c-n (e.g., in a period up until the receipt of further software update information 32a, 32c-n).

In this way, the techniques of the present disclosure may in some examples use components that are already present in the vehicle, e.g., a persistent memory 41 that is used in a process of updating the software of vehicle 20. In some cases, this may lead to a considerable saving on components (as described above, the memory needed to store a software bundle or software container 31 of software update information 32a, 32c-n may assume sizeable proportions). In addition or alternatively, it may be possible to avoid equipping the individual components with additional resources (e.g., memory), and this may likewise reduce the complexity and hence the error rate and/or costs.

Further additionally or alternatively, the information from persistent memory 41 is in many situations available quickly, and independently of the usability of a communication channel of the vehicle. This may improve the response time of the mitigation process to a manipulation.

In the techniques of the present disclosure, the mitigation countermeasure may be carried out substantially without the aid of systems outside vehicle 20 (e.g., remote system 30). For example, the countermeasure may be initiated by central device for mitigating a software manipulation 25 without the need to communicate with systems outside vehicle 20 (during this process, vehicle 20 may of course communicate with a system outside vehicle 20 for other purposes). Additionally or alternatively, central device for mitigating a software manipulation 25 (or another component of the on-board network) may carry out a countermeasure without the need to communicate with systems outside vehicle 20.

In some examples, the techniques of the present disclosure may include selecting a countermeasure from a plurality of countermeasures, based on contextual information for the vehicle. The contextual information may include information relating to an operating state of vehicle 20 and/or relating to predetermined rules for operating vehicle 20.

An operating state may be a driving state of the vehicle (e.g., fast driving, slow driving, performing certain driving maneuvers, etc.), but also an operating state during which the vehicle is not moving. Alternatively or additionally, the contextual information for vehicle 20 may include environment information and/or status information relating to components of the vehicle.

The rules for operating vehicle 20 may include predetermined safety criteria (which may in turn depend on operating states of vehicle 20 and which define when and under what conditions it is permissible to initiate a countermeasure for a specific component, for example).

At least part of the contextual information may be stored in a memory of central device for mitigating a software manipulation 25 (e.g., central persistent memory 41) for use when selecting a countermeasure (particularly the part of the contextual information that includes information relating to predetermined rules for operating vehicle 20). In some examples, the contextual information may be updated from outside vehicle 20 (e.g., as part of software update information 32b for central device for mitigating a software manipulation 25 or for a component in which central device for mitigating a software manipulation 25 is arranged).

In some examples, various countermeasures may be available for mitigating specific manipulations of the software of components 27a, c-n (see below for more details about the possible countermeasures). The contextual information may then be used to select one of the available countermeasures. In some examples, where a number of countermeasures are available, the one that permits the component to be restored as closely as possible to a target state (i.e., that remediates the manipulation as far as possible) may be selected. On the other hand, available countermeasures may in some situations be ruled out on the basis of rules contained in the contextual information (e.g., if a specific safety criterion would be violated).

For example, a first countermeasure may allow for a greater mitigation of the manipulation than a second countermeasure, but on the other hand may entail a more radical intervention in the components of the vehicle (and hence a greater risk of disruptions that may be brought about by the mitigation process itself). A second countermeasure may allow for a less extensive mitigation of the manipulation in comparison to the first countermeasure, but on the other hand may also entail a less radical intervention in the components of the vehicle. In this case, the first countermeasure may be selected in a first context (expressed by the contextual information) and the second countermeasure selected in a second context (expressed by the contextual information). In an illustrative example, the first context may be a context in which the vehicle is traveling at speed and the second context a context in which the vehicle is stationary. In other cases, the contextual information may include a safety criterion, compliance with which prohibits performance of the first countermeasure in a first situation but permits it in a second situation.

In some examples, the countermeasures may include an immediate reset (e.g., within five minutes or within one minute) of the software of first component 27a, c-f using software component 42a, c-n stored in central persistent memory 41 (e.g., generated on the basis of the software update information received) for component 27a, c-f for which a manipulation was identified, and a subsequent reset of the software of component 27a, c-f using software components 42a, c-n for component 27a, c-f in question.

On the other hand, an immediate reset may be ruled out in some contexts (e.g., due to safety criteria). The subsequent reset may take place in a period up until the next reboot of respective component 27a, c-f, for example.

Figure 5:
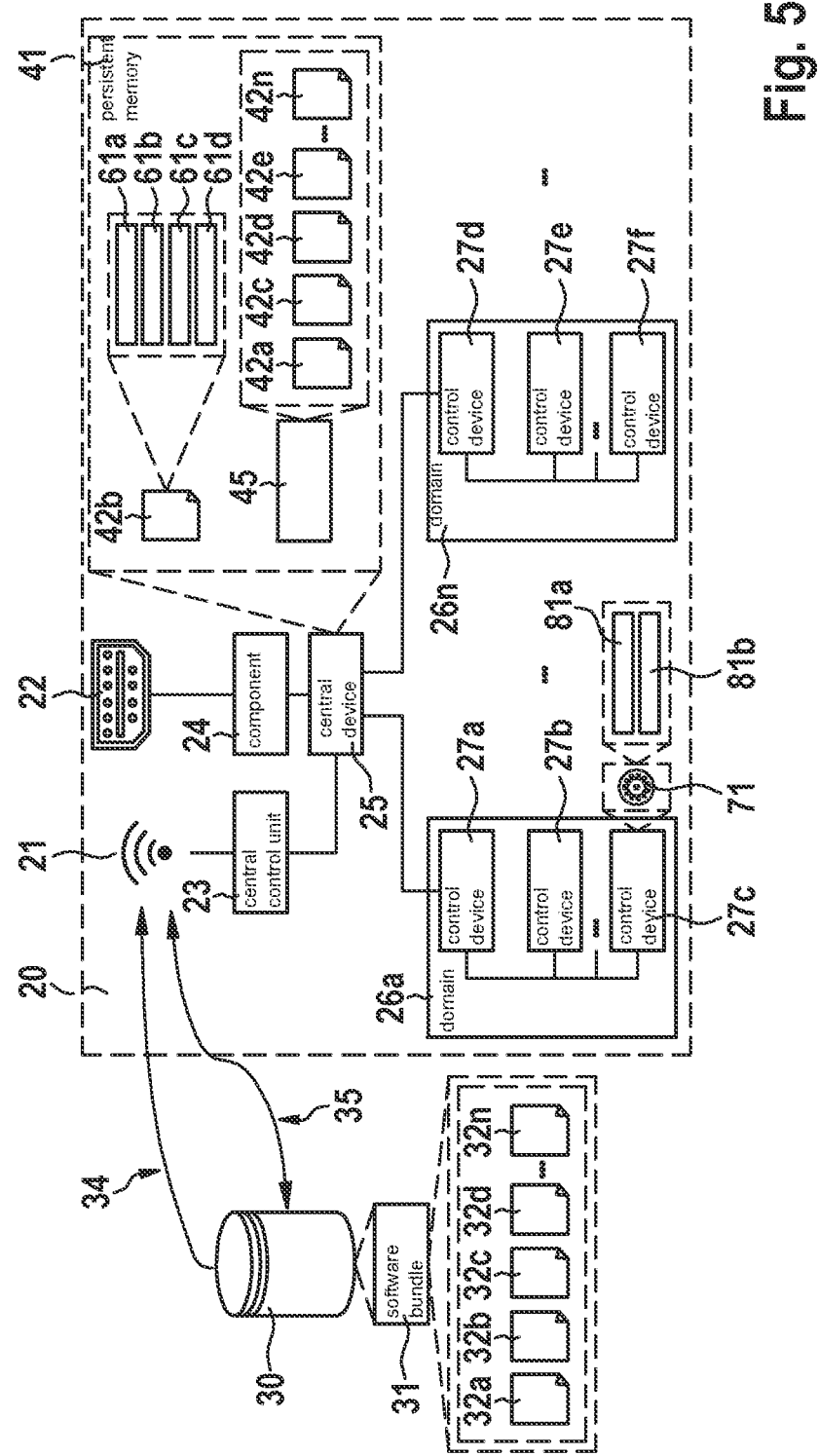
FIG. 5 shows the on-board network according to FIG. 2, in which a first component has been manipulated.
Figure 6:
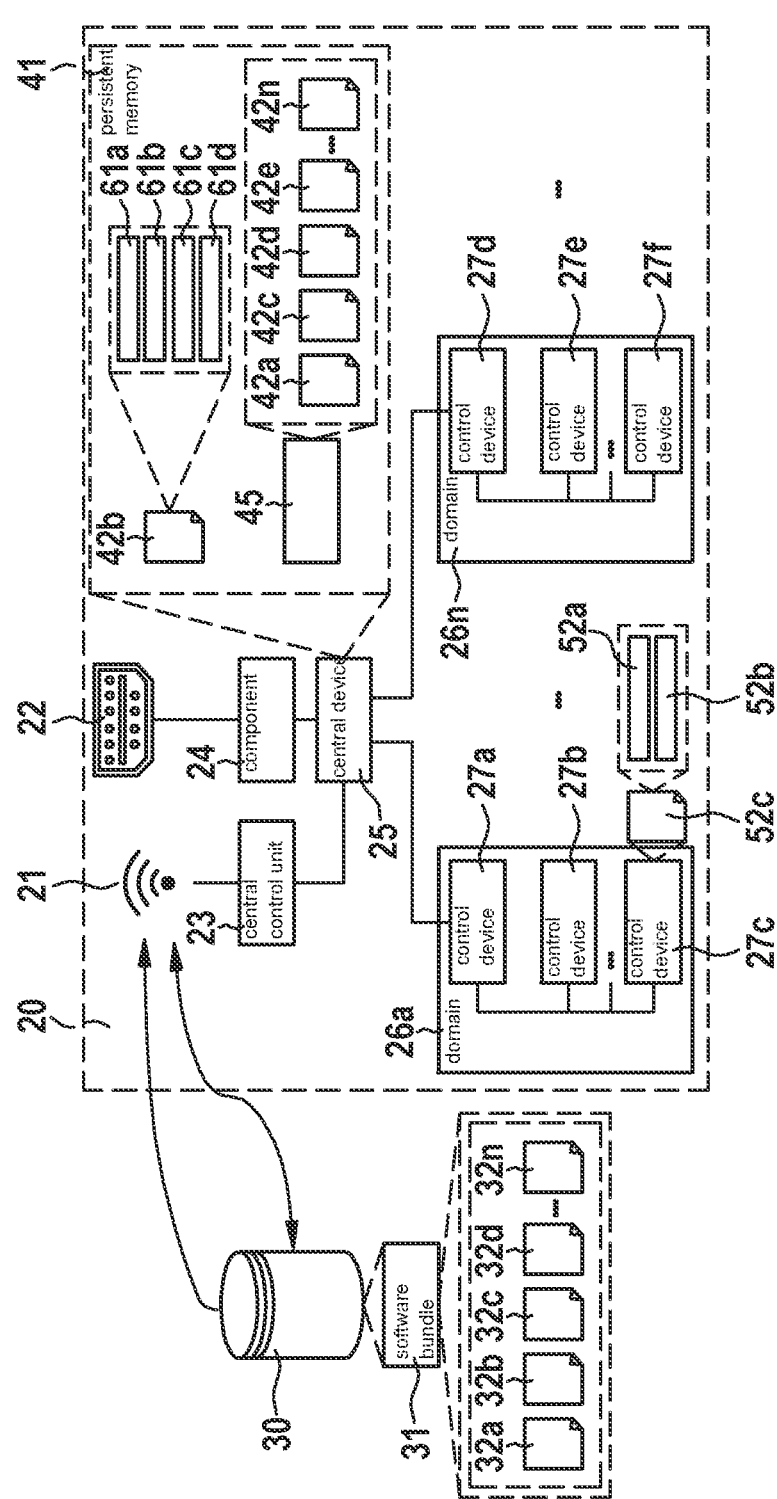
FIG. 6 shows the on-board network according to FIG. 2, in which the manipulation of the first component has been remediated, according to an example embodiment of the present invention.

Further aspects of the techniques of the present disclosure are explained below by reference to FIG. 5 and FIG. 6. FIG. 5 shows the on-board network according to FIG. 2, in which a first component 27c has been manipulated. FIG. 6 shows the on-board network according to FIG. 2, in which the manipulation of first component 27c has been remediated.

First of all, some aspects of detecting the manipulation of the software of a component 27a, c-f of vehicle 20 are explained in more detail. As mentioned above, the techniques of the present disclosure may include identifying a possibility of a manipulation of the software of a component of a plurality of components of an on-board network, which in some examples involves receiving a signal. This signal may be generated in various ways.

Firstly, a manipulation of a piece of software of a component 27a, c-f may be detected. This detection may take place locally by way of corresponding (manipulation) detection devices of the component in question.

In FIG. 5, the software of one of the control devices 27c (the "first component" in some examples of the present disclosure) has been manipulated. A manipulated software component 71 has been introduced.

Further aspects of the countermeasure of resetting the software of first component 27c using a software component 42c stored in central persistent memory 41 for first component 27c are now discussed with reference to FIG. 5 and FIG. 6.

Central device for mitigating a manipulation 25 may select a countermeasure on the basis of a detection of the manipulation of first component 27c. In the example of FIG. 5 and FIG. 6, a reset of the software of first component 27c is selected as a countermeasure. The reset may include returning the software to a last authenticated state. This may involve deleting and/or overwriting parts or all of the software of first component 27c (e.g., a control device). The deletion and/or overwriting of parts or all of the software of first component 27c may be carried out by central device for mitigating a manipulation 25 remotely (i.e., via a connection of the on-board network). In this way, manipulated software component 71, or parts thereof 81a, 81b, may be replaced by an authentic (i.e., non-manipulated) software component 52c, or parts thereof 53a, 53b, in order to remediate the manipulation.

The authentic (i.e., non-manipulated) software 52c may be retrieved from persistent memory 41. As already mentioned, persistent memory 41 may contain software component 42c in a directly usable form or in a form that is usable only after one or more processing steps to reset manipulated software component 71 of first component 27c.

In some examples, central device for mitigating a manipulation 25 may carry out measures to ensure the authenticity of software components 42a, c-n that are used to reset the software of the components. For example, an authenticity check may be performed (by way of a digital signature or another security feature, for example) prior to using a software component 42a, c-n. For the authenticity check, central device for mitigating a manipulation 25 may rely on functionalities of the component into which central device for mitigating a manipulation 25 is integrated.

In some examples, persistent memory 41 may include more than one version of a software component for a specific component of the on-board network. In this case, central device for mitigating a manipulation 25 may select one of the versions (e.g., a current version of the software component).

In the preceding paragraphs, a countermeasure for mitigating the manipulation of a first component 27c of the on-board network was discussed with reference to FIG. 5 and FIG. 6. However, central device for mitigating a manipulation 25 is set up to initiate countermeasures relating to the manipulation of the software of one or more further components of the plurality of components 27a, d-f at another time or at the same time as mitigating the manipulation of the software of first component 27c.

In some examples, central device for mitigating a manipulation 25 is designed to identify the possibility of a manipulation of the software of a further component 27a, d-f of the plurality of components of the on-board network and to initiate a further countermeasure to mitigate the manipulation of further component 27a, d-f. The detection of the manipulation and the initiation and performance of the countermeasures may take place as described above. For example, a manipulated software component of further component 27a, d-f may be reset.

In this way, a single central device for mitigating a manipulation may support a plurality of distant components (e.g., control devices in various domains) in the on-board network (in other words, remediate software manipulations in the plurality of components).

In the preceding paragraphs, a reset of a piece of software of a component was described as an example of a further countermeasure that is initiated by the central device for mitigating a manipulation and is carried out in the on-board network.

In some examples, the central device for mitigating a manipulation may alternatively or additionally initiate further countermeasures which are carried out in the on-board network.

In some examples, the further countermeasure against the manipulation may include blocking a communication via the on-board network by first component 27c (the software of which has been manipulated). Blocking communication may prevent a piece of manipulated software of first component 27c from causing damage via the on-board network. On the other hand, a piece of manipulated software may still continue to perform a function of first component 27c (e.g. for a certain period of time). For that reason, blocking communication via the on-board network by first component 27c may in some cases be preferred to resetting the software of first component 27c (e.g., in a context in which an outage of first component 27c is not tolerable or desirable, at least in the short term). The further countermeasure of resetting the software of first component 27c may be initiated and carried out subsequent to the further countermeasure of blocking communication by first component 27c (e.g., in a changed context).

Alternatively or additionally, the further countermeasure against the manipulation may include blocking a communication via the on-board network by a group of components, which includes first component 27c. In the example of FIG. 3, first component 27c may be contained in a first domain 26a with further components 27a, b. Blocking communication via the on-board network by a group of components is similar to blocking the individual component, as described above. In this case too, it may be possible to prevent damage from being caused in the on-board network by the group of components. Also in the case where communication by a group of components via the on-board network is blocked, the further countermeasure of resetting the software of first component 27c may be initiated and carried out at a later time (e.g., in a changed context).

In the preceding paragraphs, the techniques of the present disclosure were described a number of times by reference to the various methods. The present disclosure also concerns a system that is designed to carry out the methods of the present disclosure. The system may comprise one or more components of the on-board network of the vehicle (e.g., may be integrated therein). The on-board network may also include devices that are only included in the on-board network from time to time (e.g., a mobile device that is located in the vehicle and is integrated into the on-board network). In other examples, the system may also include a remote system.

As described above, the central device for mitigating a software manipulation may be a stand-alone device (i.e., a dedicated module with its own hardware and software resources, which is part of the on-board network and is able to communicate with the other components of the on-board network). In other cases, however, the central device for mitigating a software manipulation is integrated into another (already existing) component of the on-board network. The central device for mitigating a software manipulation may be designed in this case as a software module (which is incorporated into the software of the component). In other cases, the central device for mitigating a software manipulation may have at least some dedicated hardware components (while sharing other hardware components of the component into which it is integrated). As has also been mentioned, the other component may be a central communication interface of the on-board network, a central computer (vehicle computer), or another component with comparatively high-performance hardware.

In some examples, an existing component of the on-board network (e.g., a central communication interface of the vehicle or of a domain of the vehicle, or a central computer of the vehicle, or a head unit of an infotainment system) may be set up as the central device for mitigating a software manipulation by updating the software of the component of the on-board network.

The central device for mitigating a software manipulation or the other component into which it is integrated may include at least one processor (possibly with a plurality of cores) and a memory, which contains commands that, when executed by the processor, carry out the steps of the methods of the present disclosure.

The present disclosure further concerns an on-board network for a vehicle, comprising at least one central device for mitigating a software manipulation according to the present disclosure and a plurality of components of the on-board network. The on-board network may be designed to carry out the techniques of the present disclosure (as described above).

However, the present disclosure also concerns an on-board network for a vehicle, comprising at least one central device for mitigating a software manipulation according to the present disclosure and a plurality of components of the on-board network. The on-board network may be designed to carry out the methods of the present disclosure. The on-board network may also include devices that are only included in the on-board network from time to time (e.g., a mobile device that is located in the vehicle and is integrated into the on-board network).

The present disclosure further concerns a vehicle which includes the system according to the present disclosure and/or is part thereof and/or includes an on-board network according to the present disclosure.

The present disclosure further concerns a computer program which is designed to carry out the methods of the present disclosure.

The present disclosure further concerns a computer-readable medium (e.g., a DVD or a solid-state memory) which contains a computer program of the present disclosure.

The present disclosure further concerns a signal (e.g., an electromagnetic signal according to a wireless or wired communication protocol) which encodes a computer program of the present disclosure.

What is claimed is:

1. A computer-implemented method, comprising the following steps:

analyzing a communication, secured by one or more cryptographic methods, between a first component of a plurality of components of an on-board network of a vehicle and a processor configured to mitigate a software manipulation, the processor configured to mitigate a manipulation being part of the on-board network and being configured for software mitigation in each of the plurality of components of the on-board network;

identifying a possibility of a manipulation of the software of the first component in the processor configured to mitigate a software manipulation, based on the analysis of the communication; and initiating a countermeasure to mitigate the manipulation of software of the first component using the processor configured to mitigate a manipulation;

wherein the analysis includes establishing an absence of a message from the first component;

wherein the countermeasure against the manipulation includes resetting the software of the first component.

2. The method as recited in claim 1, wherein the communication by the first component originates from a security module of the first component.

3. The method as recited in claim 2, wherein the security module of the first component is a hardware security module of the first component.

4. The method as recited in claim 2, wherein the security module of the first component is configured to detect a possibility of a manipulation.

5. The method as recited in claim 2, wherein the security module of the first component has direct access to a transmission path of the on-board network.

6. The method as recited in claim 2, wherein the security module of the first component has direct access to a transmission path of the on-board network via a bus interface of the first component.

7. The method as recited in claim 1, wherein the communication includes a message from the first component indicating the possibility of a software manipulation.

8. The method as recited in claim 1, wherein the first component and the processor configured to mitigate a software manipulation are configured to repeatedly exchange messages.

9. A system, configured to:

analyze a communication, secured by one or more cryptographic methods, between a first component of a plurality of components of an on-board network of a vehicle and a processor configured to mitigate a software manipulation, the processor configured to mitigate a manipulation being part of the on-board network and being configured for software mitigation in each of the plurality of components of the on-board network;

identify a possibility of a manipulation of the software of the first component in the processor configured to mitigate a software manipulation, based on the analysis of the communication; and initiate a countermeasure to mitigate the manipulation of software of the first component using the processor configured to mitigate a manipulation;

wherein the analysis includes establishing an absence of a message from the first component;

wherein the countermeasure against the manipulation includes resetting the software of the first component.

10. A processor for mitigating a software manipulation in a plurality of components of an on-board network of a vehicle, the processor configured to:

analyze a communication, secured by one or more cryptographic methods, between a first component of a plurality of components of an on-board network of a vehicle and the processor, the processor being part of the on-board network and being configured for software mitigation in each of the plurality of components of the on-board network;

identify a possibility of a manipulation of the software of the first component in the processor, based on the analysis of the communication; and initiate a countermeasure to mitigate the manipulation of software of the first component using the central device-processor;

wherein the analysis includes establishing an absence of a message from the first component;

wherein the countermeasure against the manipulation includes resetting the software of the first component.

11. An on-board network for a vehicle, comprising:

a processor for mitigating a software manipulation in a plurality of components of the on-board network of a vehicle, the processor configured to:

analyze a communication, secured by one or more cryptographic methods, between a first component of a plurality of components of an on-board network of a vehicle and the processor, the processor being part of the on-board network and being configured for software mitigation in each of the plurality of components of the on-board network, identify a possibility of a manipulation of the software of the first component in the processor, based on the analysis of the communication, and initiate a countermeasure to mitigate the manipulation of software of the first component using the processor; and the plurality of components of the on-board network;

wherein the analysis includes establishing an absence of a message from the first component;

wherein the countermeasure against the manipulation includes resetting the software of the first component.

12. A vehicle, comprising:

a system, configured to:

analyze a communication, secured by one or more cryptographic methods, between a first component of a plurality of components of an on-board network of a vehicle and a processor configured to mitigate a software manipulation, the processor configured to mitigate a manipulation being part of the on-board network and being configured for software mitigation in each of the plurality of components of the on-board network;

identify a possibility of a manipulation of the software of the first component in the processor configured to mitigate a software manipulation, based on the analysis of the communication; and initiate a countermeasure to mitigate the manipulation of software of the first component using the processor configured to mitigate a manipulation;

wherein the analysis includes establishing an absence of a message from the first component;

wherein the countermeasure against the manipulation includes resetting the software of the first component.

13. A non-transitory computer-readable medium on which is stored a computer program, the computer program, when executed by a computer, causing the computer to perform the following steps:

analyzing a communication, secured by one or more cryptographic methods, between a first component of a plurality of components of an on-board network of a vehicle and a processor configured to mitigate a software manipulation, the processor configured to mitigate a manipulation being part of the on-board network and being configured for software mitigation in each of the plurality of components of the on-board network;

identifying a possibility of a manipulation of the software of the first component in the processor configured to mitigate a software manipulation, based on the analysis of the communication; and initiating a countermeasure to mitigate the manipulation of software of the first component using the processor configured to mitigate a manipulation;

wherein the analysis includes establishing an absence of a message from the first component;

wherein the countermeasure against the manipulation includes resetting the software of the first component.

* * * * *